United States Patent [19]

Mantelet

[11] 3,907,215

[45] Sept. 23, 1975

[54] MANUALLY OPERATED FOOD CHOPPER

[75] Inventor: Jean Mantelet, Paris, France

[73] Assignee: Moulinex, Société Anonyme, Bagnolet, France

[22] Filed: May 13, 1974

[21] Appl. No.: 469,683

[30] Foreign Application Priority Data
May 23, 1973 France .............................. 73.18689

[52] U.S. Cl. .............................. 241/88.4; 241/169.1
[51] Int. Cl.² .......................................... B02C 18/08
[58] Field of Search ............... 241/87.1, 88.4, 169.1, 241/224, 243

[56] References Cited
UNITED STATES PATENTS

| | | | |
|---|---|---|---|
| 2,648,365 | 8/1953 | Lacout.............................. | 241/169.1 |
| 3,357,468 | 12/1967 | Brinch-Moller.................... | 241/88.4 |
| 3,527,277 | 9/1970 | Woods.............................. | 241/88.4 |

FOREIGN PATENTS OR APPLICATIONS

| | | | |
|---|---|---|---|
| 1,022,769 | 1/1958 | Germany......................... | 241/169.1 |

*Primary Examiner*—Granville Y. Custer, Jr.
*Attorney, Agent, or Firm*—Young & Thompson

[57] ABSTRACT

A manually operated food chopper comprises a horizontal rotatable shaft with a plurality of chopper blades axially spaced therealong and a handle to rotate the shaft. The shaft is rotatably mounted in a plastic cradle, and a spring steel plate is releasably retained in the cradle with a snap action and is traversed by slots in which the chopper blades turn. A hopper which is also plastic is pivotally mounted on the cradle and is releasably retained in upright operative position by a leaf spring carried by the hopper and engageable with projections on the steel plate. The hopper has depending ears that releasably retain the shaft in the cradle so that the shaft and blades can be removed when the hopper is swung open.

4 Claims, 6 Drawing Figures

MANUALLY OPERATED FOOD CHOPPER

The present invention relates to manually operated food choppers, of the type particularly well-suited for chopping herbs such as parsley.

More particularly, the present invention concerns a food chopper having a rotatable shaft carrying thereon a series of knives, the shaft being mounted in a cradle whose bottom is pierced with a series of parallel slots for the passage of the knives, a hopper being pivotally mounted on the cradle and having a closed position in which the hopper retains the shaft in the cradle, and a swung-open position in which the cradle releases the shaft. Such a food chopper is disclosed in Certificate of Addition No. 57,295 to French Pat. No. 920,817.

Such food choppers have in the past usually been fabricated of metal. A number of attempts have been made to make them at least partially of plastic material; but since it is desirable to make the bottom of the cradle of metal so as to insure a good chopping action, there has been a problem of how to connect the metal cradle to the plastic part of the structure. In the past, this effort to combine the plastic and the metal has been carried out by mounting the plastic part on the metal part, but in practice, this has been complicated and difficult to do.

Accordingly, it is an object of the present invention to provide a food chopper of which the stationary parts are almost all plastic.

Another object of the present invention is to provide a food chopper which will be relatively simple and inexpensive to manufacture, easy to assembly, disassemble, clean, maintain and repair, and rugged and durable in use.

Briefly, the objects of the present invention are achieved by providing a plastic cradle whose bottom is formed by a slotted metal plate, which plate is resilient and snaps in place at its ends on opposite sides of the plastic cradle.

Other objects, features and advantages of the present invention will become apparent from a consideration of the following description, taken in connection with the accompanying drawings, in which.

Figure 1:
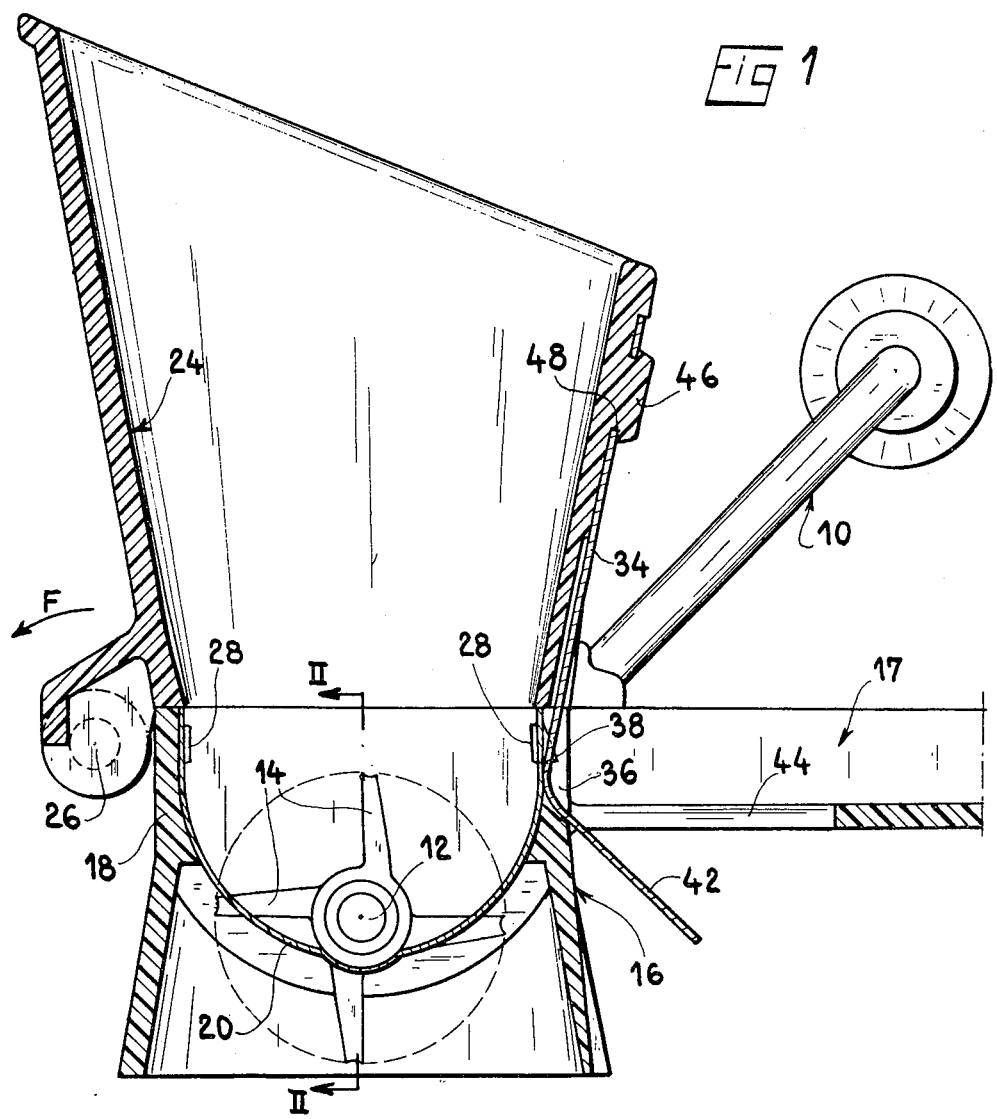
FIG. 1 is a cross-sectional view of a food chopper according to the present invention.
Figure 2:
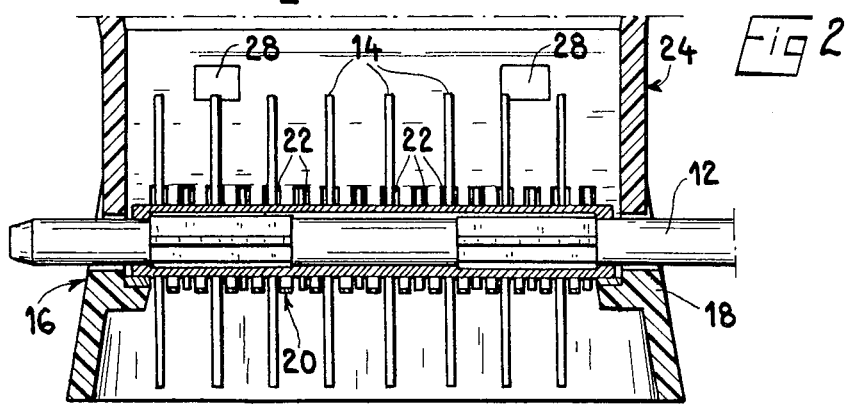
FIG. 2 is a fragmentary cross-sectional view on the line II—II of FIG. 1.

Referring now to the drawings in greater detail, there is shown a manually operated food chopper according to the present invention, comprising a rotatable handle 10 which turns a shaft 12 that bears a series of axially spaced chopper blades 14. Shaft 12 is mounted in a cradle 16 comprising a handle 17 and a sleeve 18 of plastic material that rests on the substrate such as a kitchen table and that supports a cutter plate 20 in the form of a sheet of spring steel having a plurality of parallel slots 22 therethrough for the reception of blades 14.

A hopper 24, also of plastic material, is mounted pivotally at 26 on cradle 16 and is swingable on pivot 26 between an operative upright position as shown in the drawings and an open position to which it swings in the direction of the arrow F in FIG. 1. In its FIG. 1 position, the hopper 24 maintains shaft 12 in place on cradle 16. When swung open, the hopper 24 thus releases the shaft 12, which can be removed with its blades 14 for cleaning, replacement or repair.

Cutter plate 20 is provided with a central gutter or depression in which shaft 12 is received.

Cutter plate 20 is insertable in and removable from the food chopper with a snap action. To this end, the upper parts of opposite sides of cradle 16 are provided with projections 28 that fit into openings 30 at opposite ends of cutter plate 20. Cutter plate 20 is thus generally arcuate from end to end thereof, and resiliently snaps over projections 28 at its opposite ends. The resilience of the steel of cutter plate 20 and the coaction of cutter plate 20 and cradle 16, insure that projections 28 will be resiliently retained in openings 30.

Preferably, the projections 28 and openings 30 are so positioned as to be located one in each corner of cutter plate 20. The projections 28 and openings 30 are of complementary rectangular configuration.

Figure 3:
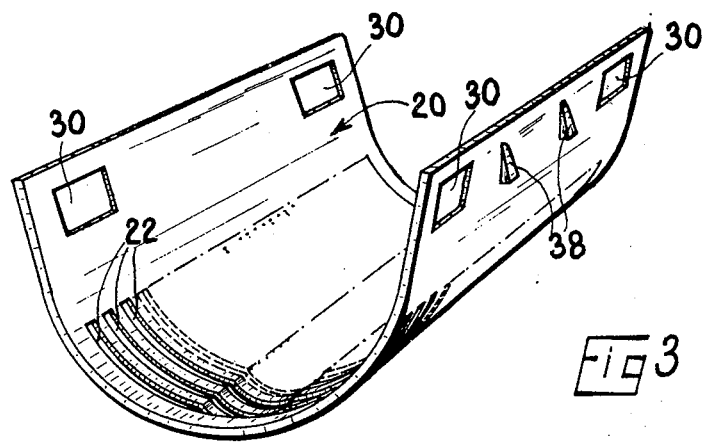
FIG. 3 is a perspective view of the metal plate which forms the bottom of the cradle of the food chopper of the present invention.
Figure 4:
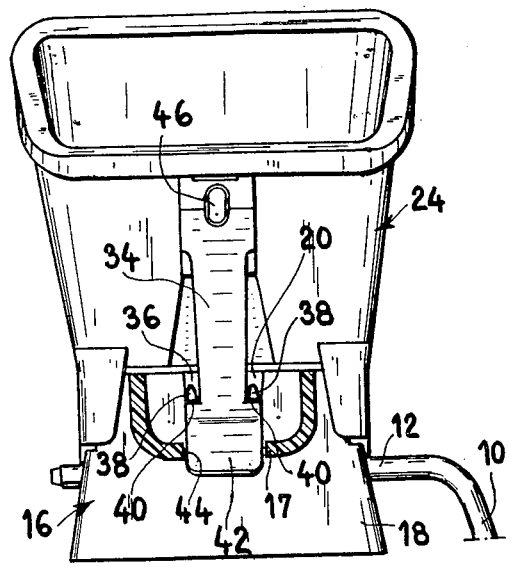
FIG. 4 is an elevational view of the invention, on a reduced scale.
Figure 6:
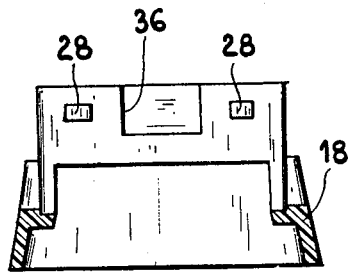
FIG. 6 is a cross-sectional view on the line VI—VI of FIG. 5.

Hopper 24 is maintained in its operative closed position by means of a leaf spring 34 secured at one end to the upper end of the hopper and releasably resiliently engaging through a recess 36 in the side walls of the cradle 16, with two projections 38 on cutter plate 20 (compare FIGS. 1 and 3). For this purpose, spring 34 has shoulders 40 on each side thereof (FIG. 4); and the free end 42 of spring 34 extends through an opening 44 in the handle 17 of the chopper.

Spring 34 is secured at its upper end to an outside wall of hopper 24 by means of a projection 46 that is disposed in an opening 48 in the upper end of spring 34. Projection 46 is headed over to retain spring 34 thereon, which assembly may be formed by molding or hot deformation.

Figure 5:
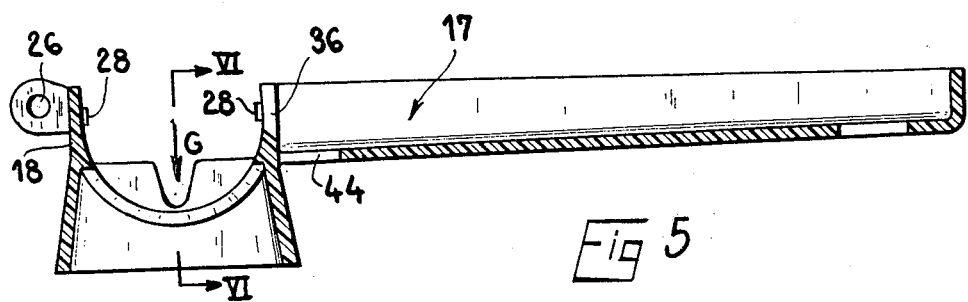
FIG. 5 is a cross-sectional view of the cradle itself.

To assemble the chopper of the present invention, one presses the cutter plate 20 down onto the cradle 16 in the direction of the arrow G in FIG. 5, the cutter plate then snapping into place as the openings 30 fit over the projections 28. In this position, the sides of the resilient cutter plate 20 press outwardly against opposite sides of the cradle 16, thereby to maintain the parts in this assembled condition. The shaft 12 is then added and the hopper 24 is swung up clockwise as seen in FIG. 1 to its closed or operative position, in which it retains shaft 12 in the assembly, and in which the shoulders 40 of the spring 34 snap over the projections 38. To open the hopper 24, it is necessary only to press counterclockwise on end 42 of spring 34 as seen in FIG. 1, and then to reverse the above operations.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A manually operated food chopper comprising a shaft having a series of chopper blades thereon, a plastic cradle in which the shaft is supported for rotation about a horizontal axis, a spring steel slotted plate retained in the cradle below the shaft and being of a generally U-shaped configuration having two legs at the ends of which means are disposed which resiliently engage with opposite side walls of the cradle, a plastic hopper mounted for vertical swinging movement on the cradle between an upright position in which the hopper feeds downwardly into the cradle and retains the shaft in the cradle and a downwardly swung position in which the hopper releases the shaft, and a leaf spring secured at one end to the hopper for releasably retaining the hopper on the cradle in said upright position, one of said legs of the steel plate having thereon retaining means over which snaps a portion of said leaf spring.

2. A food chopper as claimed in claim 1, said retaining means on the steel plate comprising at least one lateral projection over which snaps a shoulder of the leaf spring.

3. A food chopper as claimed in claim 1, wherein the leaf spring extends into engagement with said leg of the steel plate through an opening in one of said opposite side walls of the plastic cradle.

4. A food chopper as claimed in claim 1, and an upwardly opening gutter formed in a central portion of said steel plate, said shaft being disposed in said gutter.

* * * * *